June 26, 1956
D. G. BROWN
2,751,698
ADJUSTMENT MECHANISM FOR TRACTOR
MOUNTED ENDLESS DITCH DIGGER
Filed May 18, 1951
2 Sheets-Sheet 1
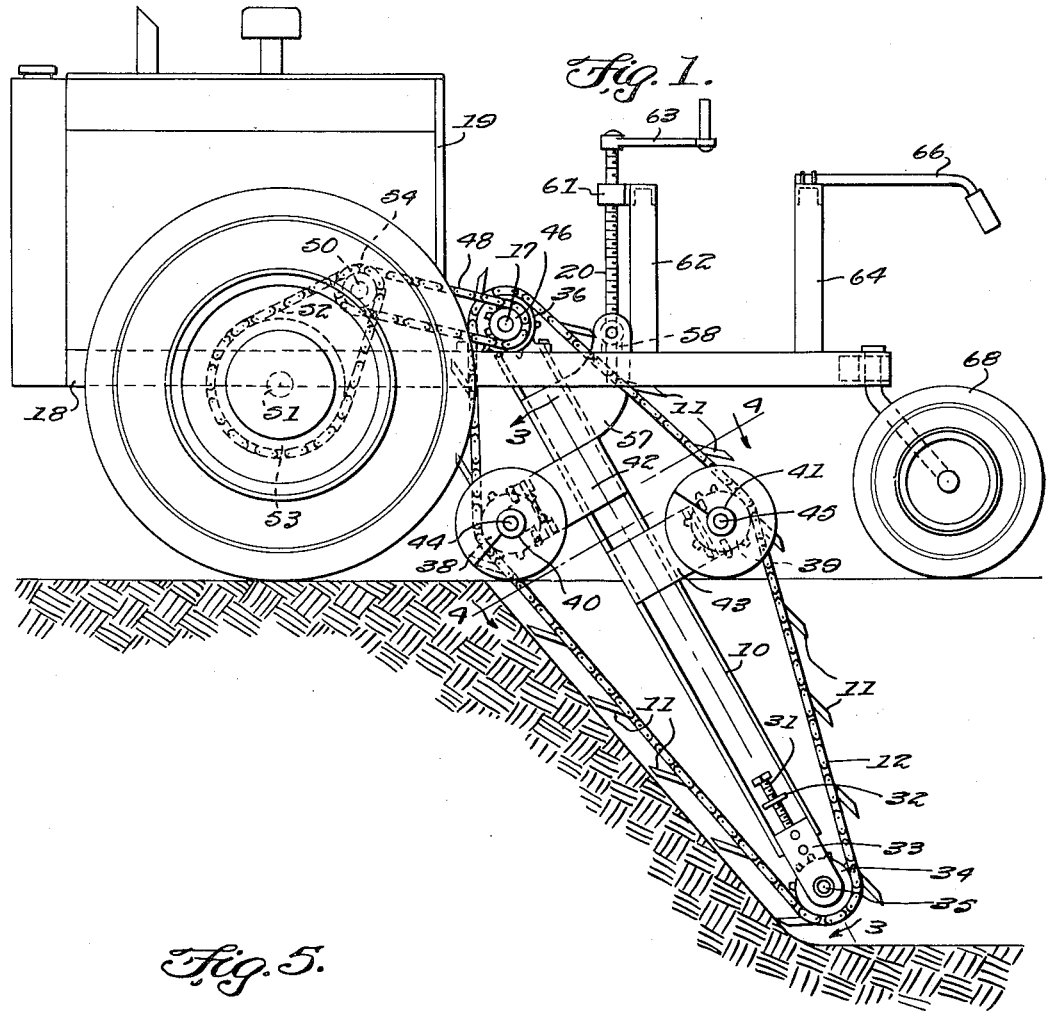
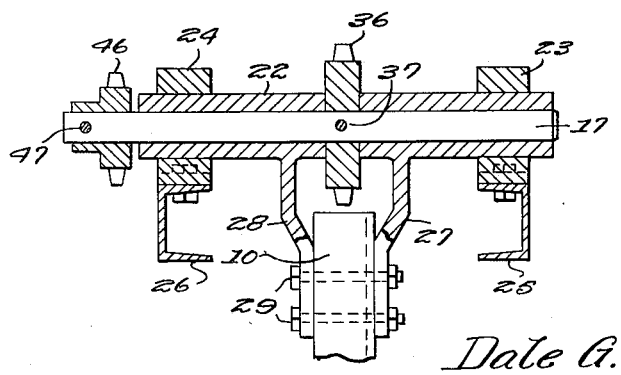
INVENTOR.
Dale G. Brown,
BY *Victor J. Evans & Co.*
ATTORNEYS June 26, 1956

D. G. BROWN 2,751,698

ADJUSTMENT MECHANISM FOR TRACTOR
MOUNTED ENDLESS DITCH DIGGER

Filed May 18, 1951

INVENTOR.
Dale G. Brown,
BY Victor J. Evans & Co.

ATTORNEYS

United States Patent Office 2,751,698
Patented June 26, 1956

2,751,698

ADJUSTMENT MECHANISM FOR TRACTOR MOUNTED ENDLESS DITCH DIGGER

Dale G. Brown, Oklahoma City, Okla.

Application May 18, 1951, Serial No. 227,088

1 Claim. (Cl. 37—86)

This invention relates to ditch digging machinery of the type having scoops or blades mounted on an endless chain with the chain carried by a boom mounted on a tractor or the like, and in particular a trench making machine for forming a comparatively narrow trench such as used for laying pipe lines.

The purpose of this invention is to provide means for mounting an endless chain having trench digging elements thereon on a tractor chassis or frame and also means for conveying materials removed from the trench from opposite sides thereof.

In the conventional type of ditch digger where comparatively large quantities of soil are removed from a ditch storage hoppers and other devices are required for conveying the soil beyond the sides of the ditch and in order to accommodate digging and conveying devices of this type the width of the machine is increased to such an extent that there are numerous places where it cannot be used. With this thought in mind this invention contemplates an endless chain having digger elements extended therefrom mounted on an elongated boom with the boom pivotally mounted on the chassis of a tractor or the like and with conveying elements carried by the boom and operated by the chain extended laterally from opposite sides of the chain for conveying soil removed by the digging elements beyond the sides of a trench formed by the elements.

The object of this invention, is therefore, to provide means for mounting trench digging elements on a tractor or the like whereby the elements are actuated from an axle of the tractor and whereby soil spreading elements are operated from trench digging units.

Another object of the invention is to provide a trench digging device for digging trenches for pipe lines and the like that may readily be actuated by a single operator.

A further object of the invention is to provide a trench digging machine for forming narrow trenches for pipe lines and the like which is of a simple and economical construction.

With these and other objects and advantages in view the invention embodies a tractor frame or chassis having a boom pivotally mounted thereon and positioned to extend downwardly below the wheels thereof and an endless chain having digger elements thereon mounted on the boom, with laterally disposed soil spreading elements carried by the boom and actuated by the chain, and with means on the chassis of the tractor for raising and lowering the boom.

Other features and advantages of the invention will appear from the following description taken in connection with the drawings wherein:

Figure 1 is a side elevational view of the improved trench digging machine illustrating the digging elements extended into a trench in the ground with the ground shown in section.

Figure 5 is a longitudinal section through the mounting shaft and adjoining parts of the chassis of the tractor and showing the upper end of the boom extended from the shaft.

Figure 2:
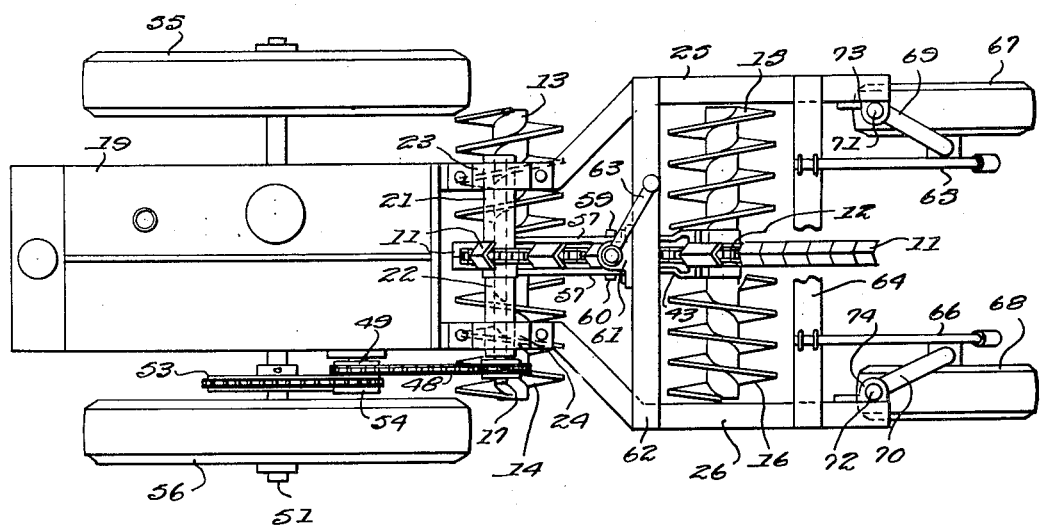
Figure 2 is a plan view of the machine.
Figure 3:
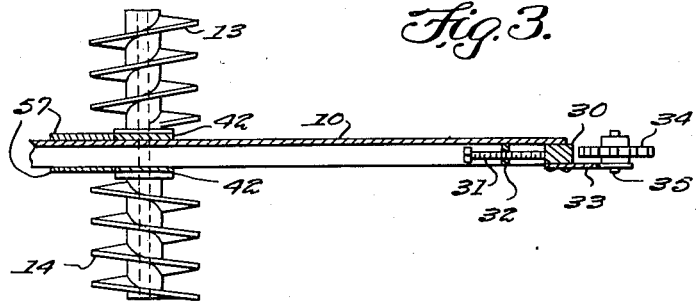
Figure 3 is a detail showing a section taken on line 3—3 of Fig. 1 illustrating the construction of the boom.
Figure 4:
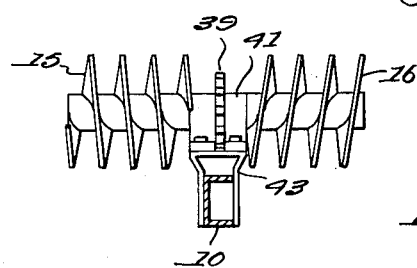
Figure 4 is a cross section through the boom taken on line 4—4 of Fig. 1.

Referring now to the drawings wherein like reference characters denote corresponding parts the improved trench digger of this invention includes a boom 10, digging elements 11, carried by a chain 12 mounted on the boom, laterally disposed screw conveyors 13 and 14 positioned on the leading side of the boom, similar screw conveyors 15 and 16 positioned on the trailing side of the boom, a mounting shaft 17 positioned on a chassis 18 of a tractor 19, and an adjusting screw 20 for raising and lowering the boom with digging elements mounted thereon.

The mounting shaft 17 is journalled in hubs 21 and 22 that are held in bearings 23 and 24 on side channels 25 and 26, respectively, and the chassis 18 and the hubs 21 and 22 are provided with depending arms 27 and 28 between which the upper end of the boom 10, which is channel shape in cross section is secured by bolts 29.

The lower end of the boom is provided with a take-up formed with a block 30 that is slidably mounted in the end of the boom and held by an adjusting screw 31 which is threaded through a lug 32 on the boom. The block 31 is provided with an extended arm 33 on the end of which a sprocket 34 is journalled by a shaft 35. The sprocket 34 is aligned with a similar sprocket 36 which is secured to the shaft 17 by a set screw 37 and a chain 12 is trained over the sprockets 34 and 36, as illustrated in Figure 1.

The chain 12 also extends over the sprockets 38 and 39 journalled in bearings 40 and 41 which are mounted on the boom through supports 42 and 43. The sprockets 38 and 39 are journaled in the bearings by shafts 44 and 45, respectively and the screw conveying elements are mounted on the outer ends of the shafts. The screw conveying elements 13 and 14 are mounted on the ends of the shaft 44, and the elements 15 and 16 on the ends of the shaft 45. With the threads of the screw conveying elements being right hand on one side of the conveyor and left hand on the other, soil excavated by the digging elements is spread laterally from the sides of the trench.

The shaft 17 is also provided with a sprocket 46 that is secured thereto by a set screw 47 and a chain 48 extends from the sprocket 46 to a similar sprocket 49 on a counter shaft 50 which is driven from the axle 51 of the tractor by a chain 52. The chain 52 is positioned on the sprockets 53 and 54. Traction wheels 55 and 56 are mounted on the axle 51 upon which the chassis 18 is mounted.

The boom 10 is also provided with arcuate plates or arms 57 between which a block 58 that is threaded on the screw 20 is positioned and the block is provided with pins 59 and 60 that extend through the plates 57. The screw 20 is threaded in a bearing 61 on a support 62 extended upwardly from the chassis 18 and as the screw is rotated by a crank 63 on the upper end thereof the block 58 travels upwardly or downwardly to raise and lower the lower end of the boom 10.

The chassis is also provided with a cross frame 64 which extends from the side beam 25 to the side beam 26, connecting the outer ends of the beams and the frame is provided with handles 65 and 66 that provide guiding means for an operator walking behind the machine.

The trailing end of the machine is supported on caster mounted rollers or wheels 67 and 68 that are mounted on brackets 69 and 70, respectively. The upper ends of the brackets are pivotally mounted by pins 71 and 72 with bearings 73 and 74, respectively.

With the parts arranged in this manner the boom 10, on which the endless chain 12 with the diggers 11 is mounted is lowered into the ground by the adjusting screw 20 and as the device travels over the ground the digging elements cut a small trench, susbtantially four inches in width, through the ground, the digging elements depositing the soil on the upper surface of the ground and the screw conveying elements carrying the soil away from the trench.

It will be understood that digging blades or elements of any suitable type or design may be used.

It will also be understood that modifications may be made in the design and arrangements of the parts without departing from the spirit of the invention.

What is claimed is:

In a trench digging machine, a chassis including side channels, bearings on said side channels, hubs supported by said bearings, a mounting shaft supported by said hubs, arms depending from said hubs, a boom connected to said arms, an endless chain mounted on said boom, a plurality of spaced apart digging elements carried by said chain, a first pair of laterally disposed screw conveyors positioned on the leading side of said boom, a second pair of screw conveyors positioned on the trailing side of said boom, a block slidably mounted on the lower end of said boom, a lug secured to said boom, an adjusting screw threadedly engaging said lug and connected to said block, a first sprocket connected to said block, a second sprocket connected to said mounting shaft and said chain being trained over said sprockets, chain and sprocket means connected to said conveyors, the threads of the conveyors being right hand on one side and left hand on the other side, arcuate plates connected to said boom, a block mounted between said arcuate plates and having pins extending therefrom, a support extended upwardly from said chassis, a bearing mounted on said support, a screw member having its lower end engaging said last named block and having a crank on its upper end, a cross frame on said chassis, handles extending from said cross frame, and rollers supporting the trailing end of said machine.

References Cited in the file of this patent

UNITED STATES PATENTS

| | | |
|---|---|---|
| 19,430 | Maydole | Feb. 23, 1858 |
| 436,241 | Humphreys | Sept. 9, 1890 |
| 645,752 | Mackey | Mar. 20, 1900 |
| 1,428,055 | Paul | Sept. 5, 1922 |
| 1,472,562 | Knight | Oct. 30, 1923 |
| 1,495,704 | Mahlstadt | May 27, 1924 |
| 1,832,787 | Penote | Nov. 17, 1931 |
| 2,519,075 | Schmidt | Aug. 15, 1950 |